United States Patent [19]

Vacchiano

[11] Patent Number: 4,860,807
[45] Date of Patent: Aug. 29, 1989

[54] PORTABLE WORKBENCH AND POWER SAW STAND

[76] Inventor: Ted Vacchiano, 295 Cranberry Rd., Farmingdale, N.J. 07727

[21] Appl. No.: 257,061

[22] Filed: Oct. 13, 1988

[51] Int. Cl.$^4$ ............................. B27B 5/24; B27C 9/00
[52] U.S. Cl. ................................ 144/286 R; 83/471.3; 83/574; 83/477.2; 144/1 R; 144/286 A; 144/287
[58] Field of Search .................... 83/477.1, 477.2, 574, 83/527; 144/1 R, 286 R, 286 A, 287

[56] References Cited

U.S. PATENT DOCUMENTS

| | | | |
|---|---|---|---|
| 3,118,685 | 1/1964 | Jordan | 144/285 |
| 3,771,848 | 11/1973 | Claywell | 144/285 |
| 4,335,765 | 6/1982 | Murphy | 83/574 |
| 4,561,336 | 12/1985 | Davis | 144/287 |
| 4,694,720 | 9/1987 | Brickner, Jr. et al. | 144/286 R |

*Primary Examiner*—W. Donald Bray
*Attorney, Agent, or Firm*—Clifford G. Frayne

[57] ABSTRACT

A transportable, adjustable power saw station having a centrally disposed saw mounting stand and a workpiece station disposed of opposing sides of the power saw stand, the workbench of tubular construction having foldable legs and extension wings for extending the workpiece station, the extension wings being removably secured to the workbench when not in use, the work station and saw transportable by means of wheels mounted on one end of the tubular frame.

3 Claims, 3 Drawing Sheets

PORTABLE WORKBENCH AND POWER SAW STAND

FIELD OF INVENTION

The present invention relates to portable workbenches and, in particular, a workbench having wheels mounted thereon which permits a single operator to transport and relocate the workbench with the power saw secured thereto.

BACKGROUND OF THE INVENTION

Carpenters and tradesmen require the use of workbenches of varying designs on construction sites. Further, the workbenches vary in size and dimension with respect to the type of work being performed and the type of lumber being utilized. In particular, with respect to finishing work involving floor trim, ceiling trim and door jamb trim, it is necessary to have a workbench which supports this type of material which normally comes in long pieces, and to further be adjustable in height to accommodate the saw utilized for this fine detail work in matching up the pieces of trim. Further, since the trim is installed toward the end of the construction process, the carpenter or tradesman must follow the layout of the residence or building in order to move from room to room to obtain the necessary measurements and the necessary lumber. It is therefore desirable to have a workbench which permits the power saw to be mounted thereon and which also permits a single operator to move the workbench with the power saw secured thereto, from room to room or building to building in an easy manner in order to expedite the installation of this type of woodwork trim.

OBJECTS OF THE INVENTION

An object of the present invention is to provide a novel portable workbench which is easily transported by one individual.

It is a further object of the present invention to provide a novel portable workbench which is transportable with the power saw secured thereto.

It is a still further object of the present invention to provide a novel adjustable workbench which is easily foldable for vehicular transportation.

It is a still further object of the present invention to provide a novel power saw workbench which provides a stable platform and accepts a variety of power saws yet is capable of being hand transported in a rolled fashion.

SUMMARY OF THE INVENTION

The present invention comprises a central frame having a centrally positioned adjustable saw mounting platform, the central frame having adjustable extendable arms at the transverse end thereof for the support of the trim and lumber to be cut, the central frame having a pair of rotatable, foldable legs for support of said frame, at least one pair of said legs having positioned proximate thereto, a set of wheels for the transportation of the workbench in a fold-down position from one position to another.

BRIEF DESCRIPTION OF THE DRAWINGS

These and other objects of the present invention will be manifest in considering the accompanying drawings wherein.

DETAILED DESCRIPTION OF THE DRAWINGS

Figure 1:
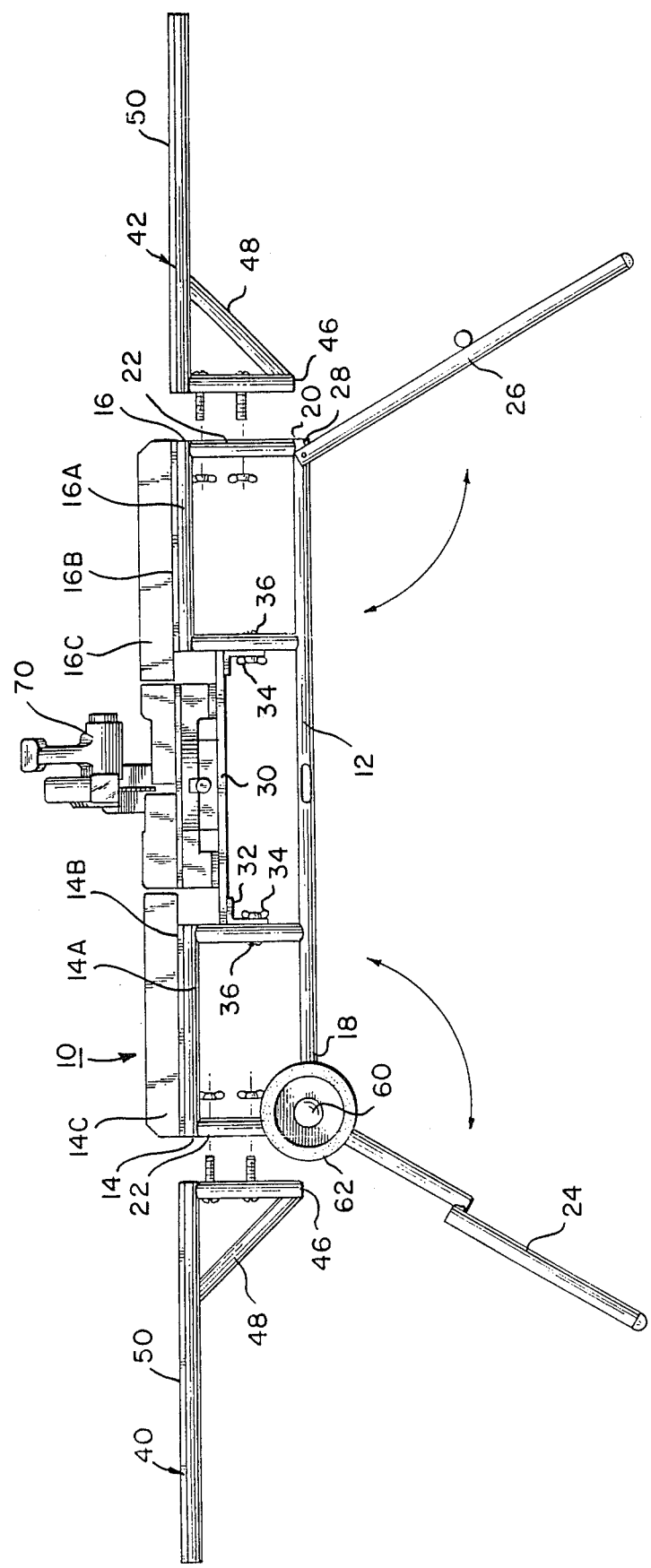
FIG. 1 is a front elevational view of the workbench.
Figure 2:
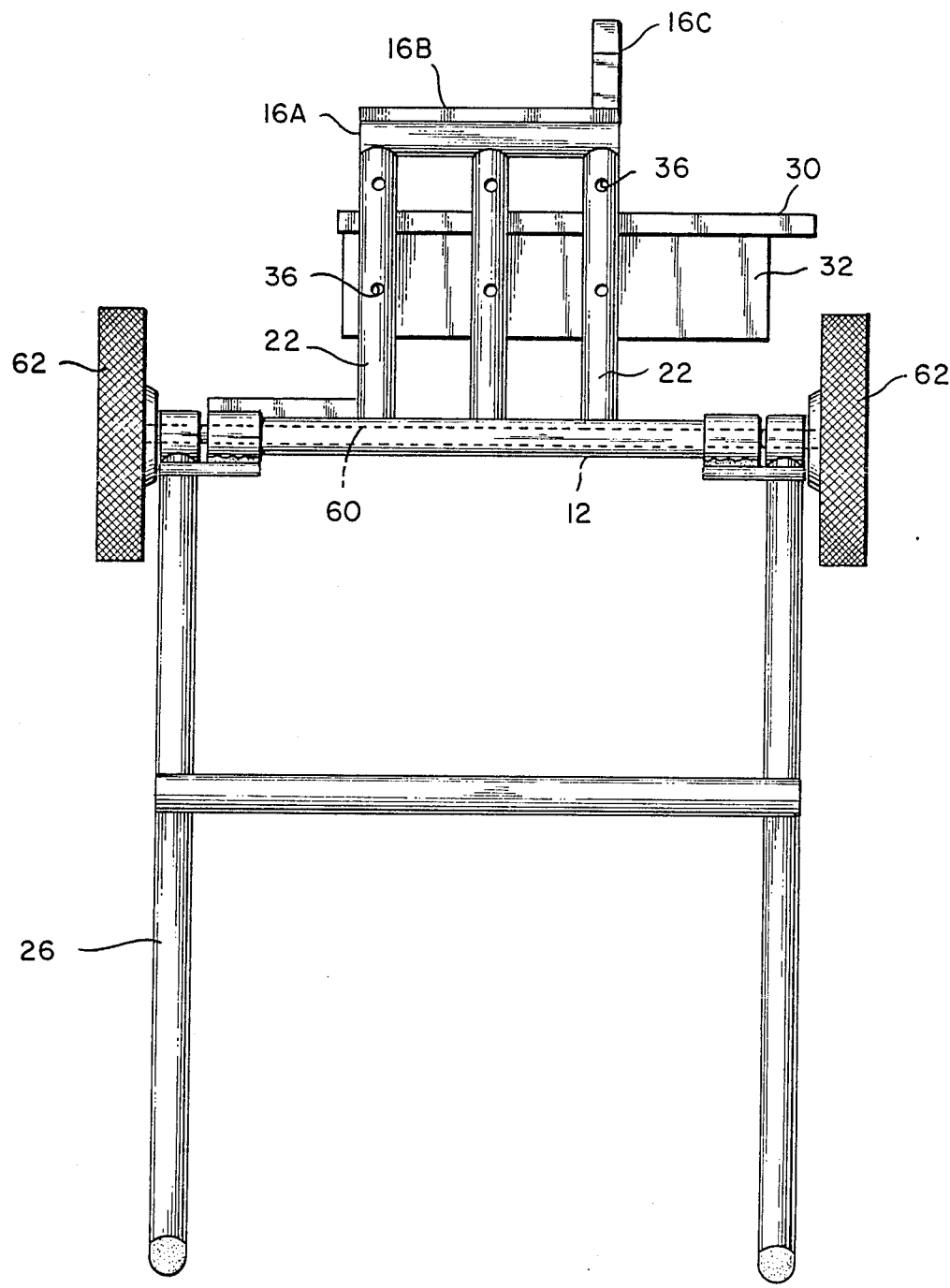
FIG. 2 is a side elevational view of the workbench.

Referring to FIG. 1, there is shown a side elevational view of the workbench 10, which is comprised of a central frame having a rectangular tubular support base 12 having two support platforms 14 and 16 depending upwardly therefrom at ends 18 and 20. Support platforms 14 and 16 are comprised of tubular vertical support struts 22 which support tubular horizontal frame 14A and 16A respectively. A wooden base 14B and 16B respectively are secured to the top of the tubular horizontal frame to provide support for the lumber to be manipulated. A better view of the configuration of the tubular frame of support platforms 14 and 16 can best be seen with reference to FIG. 2. In this view, it can be seen that the support platforms 14 and 16 depend upwardly from base 12, but the tubular frame comprising support platforms 14 and 16 is not as wide as the tubular frame comprising support base 12 and that these are a plurality of tubular vertical support struts 22 supporting horizontal frames 14A and 16A and base 14B and 16B.

Support base 12 has rotatably secured to its longitudinal ends 18 and 20, depending support legs 24 and 26 which are rotatable from a transport position when they are substantially flush with support base 12 to an extended support position as shown in FIG. 1, the limit of their arcuate extension being limited by stop pins, such as stop pin 28 as shown in conjunction with support leg 26.

When support legs 24 and 26 are in the transport position, they can be secured to support base 12 to prevent their extension by means of snap clips or pin locks communicating between coincident apertures in support legs 24 and 26 and apertures in the longitudinal tubular frame of support base 12.

Adjustably positionable between support platforms 14 and 16, and secured to their interior tubular frame, is a saw support base 30. Saw support base 30 is planer and substantially identical in length with the distance between support platforms 14 and 16 so as to fit snugly between support kplatforms 14 and 16. Saw support base 30 has depending planer end plates 32 and 34 which can best be seen in FIG. 2 which end plates have a series of apertures 36 for alignment with apertures in the vertical tubular support struts 22 of support platforms 14 and 16 so that the height of saw support base 30 may be adjusted and then secured in position by means of a lock pin or threaded fastener.

Figure 3:
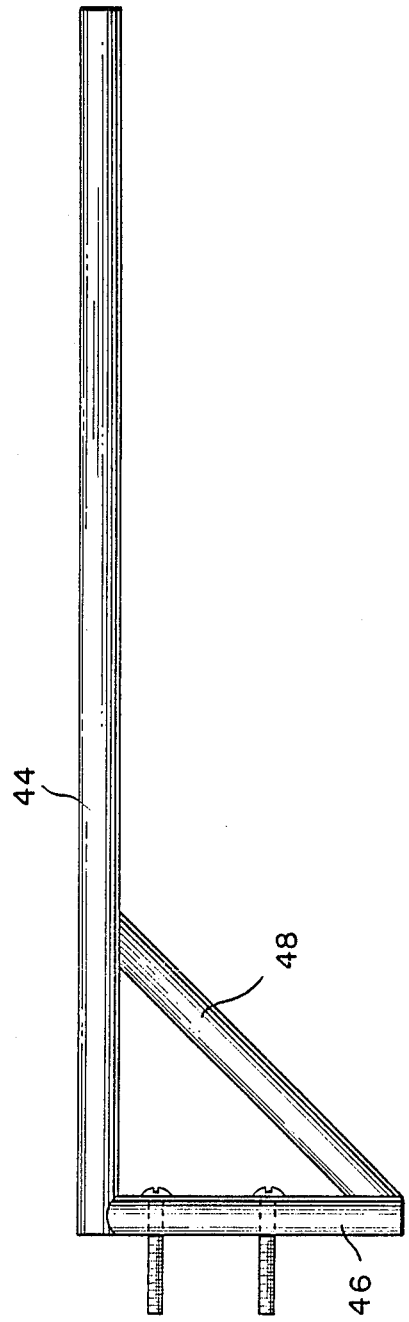
FIG. 3 is a side elevational view of a support wing.
Figure 4:
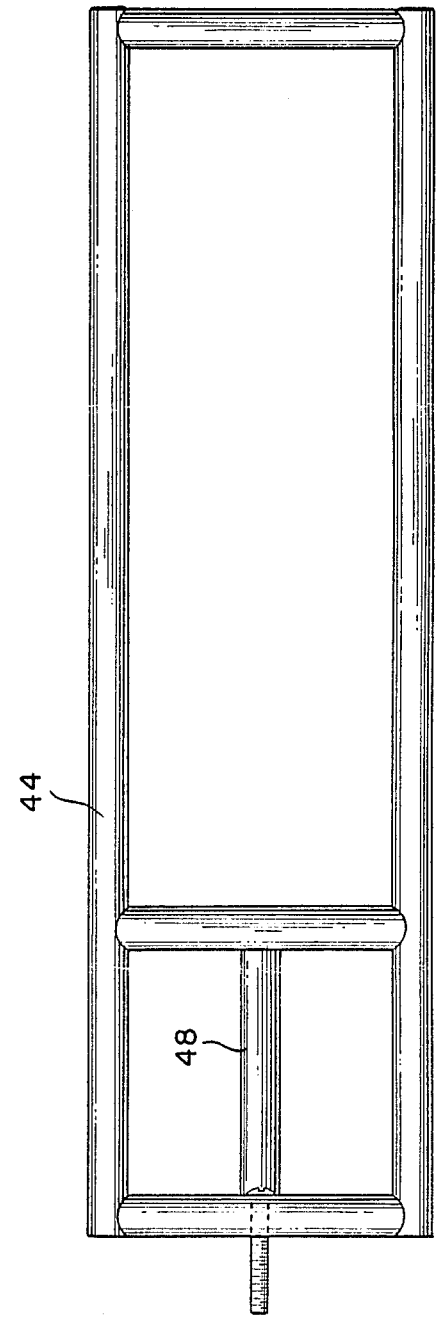
FIG. 4 is a top elevational view of a support wing.

Removably secured to support platforms 14 and 16 respectively on their outer vertical tubular struts 22, are detachable support wings 40 and 42. As can best be seen with respect to FIGS. 3 and 4, support wings 40 and 42 comprise a horizontal tubular rectangular shaped support frame 44 having a vertical tubular connecting frame 46 secured to one end, a cantilever support arm 48 being secured between vertical tubular connecting frame 46 and horizontal supporting frame 44. A planer supporting surface 50, would be secured to horizontal planer tubular frame 44.

Vertical connecting frame 46 would have a series of apertures therethrough for alignment with apertures in the vertical tubular struts of support platforms 14 and 16 to allow support wings 40 and 42 to be attached to support columns 14 and 16 such that planer support base 50 would be in alignment with support base 14B and 16B on support columns 14 and 16. In this configuration, the workbench can accommodate rather long pieces of lumber.

Secured along one upper longitudinal edge of support columns 14 and 16, would be a backstop 14C and 16C respectively which would be used for alignment of the lumber and prevent the lateral movement of the lumber.

Secured to one end of support frame 12 by means of a fixed axle 60, secured in the longitudinal tubular end portion of support frame 12, would be a pair of freely rotatable wheels 62 to provide for the expedient transfer of the workbench from one location to another.

Referring back to FIG. 1, the workbench 10 is shown in an upright position. The carpenter would mount the saw mechanism on saw support base 30 by means of the vise attachments attached to the saw itself. The carpenter then can utilize long pieces of lumber or molding by placing such lumber or molding on the platform defined by base 14B and 16B of support platform 14 and 16 and planer supporting surface 50 of support wings 40 and 42. The saw 70 is then adjusted and the operator would utilize backstop 14C and 16C respectively as transverse alignment support for the piece of lumber of molding. Additionally, the operator would be provided with a working surface 13 secured to one longitudinal edge of support base 12.

The operator or carpenter could then utilize the workbench at a particular location for as long as desired.

If it became necessary for the carpenter to move the workbench to another location either within the house or building in which he was working or in close proximity thereto that it did not require the necessity of mechanical transportation, the contractor or carpenter could partially disassemble the workbench for such transportation. It would not be necessary that the operator remove the power saw 70 attached to saw support base 30. This could be left in tact. The operator would remove the support wings 40 and 42 which in the preferred embodiment would be secured to vertical tubular support struts 22 by means of a threaded fastener with wing nuts. Support wings 40 and 42 would then be turned in a horizontal plane 180 degrees such that one longitudinal edge would rest upon working surface 13 of support base 12 and at least one of the fastening means would be reversed so that it would extend outwardly through vertical support strut 22. A wing nut could be fastened to the threaded fastener to secure the support wings in this manner.

Support leg 24 would then be rotated to its transport position and secured to support base 12 by means of a snap lock or pin clip. This would place rotatable wheel 62 in communication with the ground or floor. Support leg 26 would then be rotated to the transport position and secured to support base 12, again by means of snap clips or pin locks. The contractor would then grip the workbench by means of support platform 16 and lift it vertically such that he could now push or pull the workbench with saw attached to its new location by means of wheels 62. The configuration as shown permits the operator or carpenter to proceed over a regular terrain and also permits the operator to traverse inclines and moderate stairways.

Upon arrival at the new location, the operator would reverse the process of reestablishing the workbench for operation.

The ease in which the workbench is partially disassembled for transportation also permits the operator or carpenter to transport the workbench with saw 70 secured thereto by means of vehicular locomotion without having to disassemble saw 70 from workbench 10. This saves substantial transport and set-up time.

While the invention has been described in connection with the exemplary embodiments thereof, it will be understood that many modifications will be apparent to those of ordinary skill in the art and this application is intended to cover any adaptations or variations thereof. Therefore, it is manifestly intended that this invention be only limited by the claims and the equivalents thereof.

I claim:

1. A portable workbench and power saw stand transportable with power saw attached, said portable workbench and power saw stand comprising an adjustable power saw station centrally disposed on said portable workbench for mounting said power saw, and a workpiece station disposed of opposing sides of said power saw station for supporting said workpieces, said power saw station and said workpiece station supported by integrated tubular frame to permit adjustment of said power saw station to heights proximate to said workpiece station, said support frame supported on a second rectangular tubular frame, said second tubular rectangular frame having mounted thereon, at one opposing end, a pair of wheels for transportation of said portable workbench and power saw stand, said second tubular rectangular frame having extending downwardly from opposing ends thereof, pairs of foldable support legs for supporting said portable workbench and power saw stand, said foldable support legs removably securable to said second tubular rectangular frame when in a transport position such that said pair of wheels permit the transportation of the portable workbench and power saw stand with power saw attached.

2. An apparatus in accordance with claim 1 wherein said workpiece stations have means for mounting extension wings thereon for increasing the length of said workpiece stations.

3. An apparatus in accordance with claim 1 wherein said workpiece station extensions are securable to said tubular frame for said transport mode.

* * * * *